(12) United States Patent
Singh

(10) Patent No.: US 8,265,234 B2
(45) Date of Patent: Sep. 11, 2012

(54) SYSTEMS AND METHODS FOR ENABLING A USER TO MORE EASILY NAVIGATE AN INTERACTIVE VOICE RESPONSE (IVR) MENU

(75) Inventor: Harprit Singh, Philadelphia, PA (US)

(73) Assignee: Intellicomm Inc., King of Prussia, PA (US)

( * ) Notice: Subject to any disclaimer, the term of this patent is extended or adjusted under 35 U.S.C. 154(b) by 1081 days.

(21) Appl. No.: 12/049,021

(22) Filed: Mar. 14, 2008

(65) Prior Publication Data

US 2008/0226042 A1 Sep. 18, 2008

Related U.S. Application Data (60) Provisional application No. 60/907,011, filed on Mar. 16, 2007.

(51) Int. Cl.
H04M 1/64 (2006.01)
H04L 29/06 (2006.01)
(52) U.S. Cl. ............... 379/88.04; 379/88.11; 455/414.3
(58) Field of Classification Search ..... 379/88.01–88.21
See application file for complete search history.

(56) References Cited

U.S. PATENT DOCUMENTS

| | | | |
|---|---|---|---|
| 5,802,526 A * | 9/1998 | Fawcett et al. | 379/88.13 |
| 5,850,429 A | 12/1998 | Joyce et al. | |
| 6,104,790 A | 8/2000 | Narayanaswami | |
| 6,430,174 B1 | 8/2002 | Jennings et al. | |
| 6,456,699 B1 * | 9/2002 | Burg et al. | 379/88.17 |
| 6,519,246 B1 * | 2/2003 | Strahs | 370/352 |
| 6,560,320 B1 | 5/2003 | Paleiov et al. | |
| 6,718,017 B1 | 4/2004 | Price et al. | |
| 6,788,770 B1 | 9/2004 | Cook et al. | |
| 6,885,737 B1 | 4/2005 | Gao et al. | |
| 6,920,425 B1 * | 7/2005 | Will et al. | 704/275 |
| 6,928,156 B2 | 8/2005 | Book et al. | |
| 7,016,359 B2 * | 3/2006 | Naim et al. | 370/401 |
| 7,027,571 B1 | 4/2006 | Cook | |
| 7,027,990 B2 | 4/2006 | Sussman | |
| 7,054,939 B2 | 5/2006 | Koch et al. | |
| 7,092,370 B2 | 8/2006 | Jiang et al. | |
| 7,092,738 B2 | 8/2006 | Creamer et al. | |
| 7,136,478 B1 | 11/2006 | Brand et al. | |
| 7,170,993 B2 * | 1/2007 | Anderson et al. | 379/265.09 |
| 7,860,532 B2 * | 12/2010 | Strandell et al. | 455/557 |
| 8,054,952 B1 * | 11/2011 | Or-Bach et al. | 379/88.18 |
| 8,077,840 B2 * | 12/2011 | Gao et al. | 379/88.18 |
| 2003/0039341 A1 * | 2/2003 | Burg et al. | 379/88.16 |
| 2003/0112931 A1 | 6/2003 | Brown et al. | |
| 2004/0121814 A1 * | 6/2004 | Creamer et al. | 455/563 |
| 2004/0196856 A1 * | 10/2004 | Bondarenko et al. | 370/395.52 |

(Continued)

OTHER PUBLICATIONS

"Fonolo takes the hassle out of calling large companies", FonCloud Inc., 2009, http://fonolo.com/consumer, 6 pages.

*Primary Examiner* — Fan Tsang
*Assistant Examiner* — Solomon Bezuayehu
(74) *Attorney, Agent, or Firm* — Rothwell, Figg, Ernst & Manbeck, P.C.

(57) ABSTRACT

In one aspect, the present invention provides a system and method for enabling a user to more easily navigate an IVR menu by, for example, displaying to the user a visual representation of the IVR menu.

25 Claims, 6 Drawing Sheets

U.S. PATENT DOCUMENTS

| | | |
|---|---|---|
| 2005/0152522 A1* | 7/2005 | Kumhyr .................. 379/201.04 |
| 2006/0200569 A1 | 9/2006 | Koch et al. |
| 2006/0285662 A1 | 12/2006 | Yin et al. |
| 2007/0086585 A1* | 4/2007 | Dorricott et al. ......... 379/265.01 |
| 2008/0153467 A1* | 6/2008 | Wyler et al. ................ 455/414.2 |
| 2009/0154666 A1* | 6/2009 | Rios et al. .................. 379/88.18 |
| 2009/0276441 A1* | 11/2009 | Malik ............................. 707/10 |
| 2010/0183131 A1* | 7/2010 | Chang ....................... 379/93.12 |

* cited by examiner

SYSTEMS AND METHODS FOR ENABLING A USER TO MORE EASILY NAVIGATE AN INTERACTIVE VOICE RESPONSE (IVR) MENU

This application claims the benefit of U.S. Provisional Patent Application No. 60/907,011, filed on Mar. 16, 2007, the entire contents of which are incorporated herein by this reference.

BACKGROUND

1. Field of the Invention

The present invention relates to the field of IVR. In one aspect, the invention relates to systems and methods for enabling a user to more easily navigate an IVR menu.

2. Discussion of the Background

Many companies today use IVR systems to enable their customers to perform tasks and/or obtain information. The IVR systems that most companies use these days have not seen much in the way of improvement for years. When a user calls a telephone number (e.g. a customer service telephone number) associated with an IVR system, the IVR system may prompt the user to select an option from a menu of options presented to the user (e.g., press 1 for sales, press 2 for technical support, etc.). Sometimes the number of options is so great and verbose that a user can forget and fail to decide on the first pass the selection most appropriate for him/her, forcing the user to either start listening to the entire list of prompts again or making the wrong selection.

All too often these IVR prompts that are offered to customers are a source of significant aggravation and customer dissatisfaction. They also may be the cause of significant time wastage because the process of selecting an appropriate option is linear. In other words, a customer may have to listen to all the options before the customer can determine which option best matches his/her needs (unless the customer is a frequent caller and knows the appropriate option or set of options so they can enter them before the list presented is complete, e.g. barge-in capabilities).

Additionally, there are times when a user calls a telephone number where they are asked to enter some information (e.g. account number) after one or more prompts, not knowing prior to making the call that they cannot successfully accomplish the purpose of the call without having that information.

There are other problems associated with the current IVR systems as well. For example, callers typically are not presented with a zero-out option to reach a live operator—such shortcomings being the subject of Paul English's gethuman project (gethuman.com). Another problem of current IVR systems is that a caller has no way to know the number of callers ahead of them or the approximate wait time for reaching a company representative until they actually make the call.

Companies who have an IVR system have a huge challenge of maintaining and updating their IVR prompts. Hence, quite a few resort to the customary and all too often overused warning that "Please note that our menu options have recently changed."

SUMMARY

The present invention aims to overcome at least some of the above disadvantages.

In one aspect, the present invention is a system for enabling a user to more easily navigate an IVR menu. In some embodiments, the system includes: a server program for receiving a request from a client; and means for transmitting to the client a webpage containing a control element associated with a telephone number (or other content, text, image or button) associated with the IVR menu in response to the server program receiving the request, wherein the webpage is configured such that, in response to a user activating the control element, a visual representation of the IVR menu is displayed to the user without the user ever having to call the telephone number associated with the IVR menu. The server program may be implemented using a hypertext transfer protocol (HTTP or HTTPS) server. In some embodiments, the visual representation includes information indicating a wait time and/or queue length for an option of the IVR menu.

In another aspect, the present invention is a method for enabling a user to more easily navigate an IVR menu. In some embodiments, the method includes: transmitting a request for a webpage to a server; receiving the webpage, wherein the webpage includes a telephone number of the IVR system; displaying the webpage, wherein the webpage includes a control element associated with the telephone number; activating the control element; and, in response to activation of the control element, displaying a visual representation of at least the first level of options of the IVR menu.

In some embodiments, the visual representation includes a call me option and the method further includes: prompting the user to enter a telephone number in response to the user activating the call me option; receiving the entered telephone number; and transmitting to a server the entered telephone number together with information identifying a menu option with which the call me option is associated.

In another embodiment, the method includes: receiving at a server a request from a client; in response to the request, transmitting from the server to the client a webpage containing a telephone number associated with the IVR menu and a control element positioned near the telephone number, wherein the webpage is configured such that, in response to a user activating the control element, a visual representation of the IVR menu is displayed to the user without the user ever having to call the telephone number associated with the IVR menu.

In another embodiment, the method includes: receiving a request from a client; in response to the request, transmitting to the client a webpage containing a control element associated with a telephone number associated with the IVR menu, wherein the webpage is configured such that, in response to a user activating the control element, a visual representation of the IVR menu is displayed to the user without the user ever having to call the telephone number associated with the IVR menu.

In another embodiment, the method includes: transmitting a request for a webpage to a server; receiving the webpage, wherein the webpage includes a control element associated with an IVR system; displaying the webpage; and in response to activation of the control element, displaying a visual representation of at least the first level of options of an IVR menu together with wait time and/or queue length information for one or more of the displayed menu options.

In another embodiment, the method includes: receiving at a server a request from a client; in response to the request, transmitting from the server to the client a webpage containing a visual representation of at least part of an IVR menu, wherein the visual representation of the IVR menu shows at least the first level menu options of the IVR menu and wait time and/or queue length information for at least one of the menu options of the IVR menu. The visual representation may be an image and the webpage may include an IMG tag that points to an image file containing the image. In other embodiments, the webpage includes a tag associated with a computer program for dynamically generating the visual representation. Preferably, the tag causes the client to send a request to the server (or a service provider's server), and the server to which the request is sent is configured to execute the computer program in response to receiving the request.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION OF PREFERRED EMBODIMENTS

As used herein, the words "a" and "an" mean "one or more."

Figure 1:
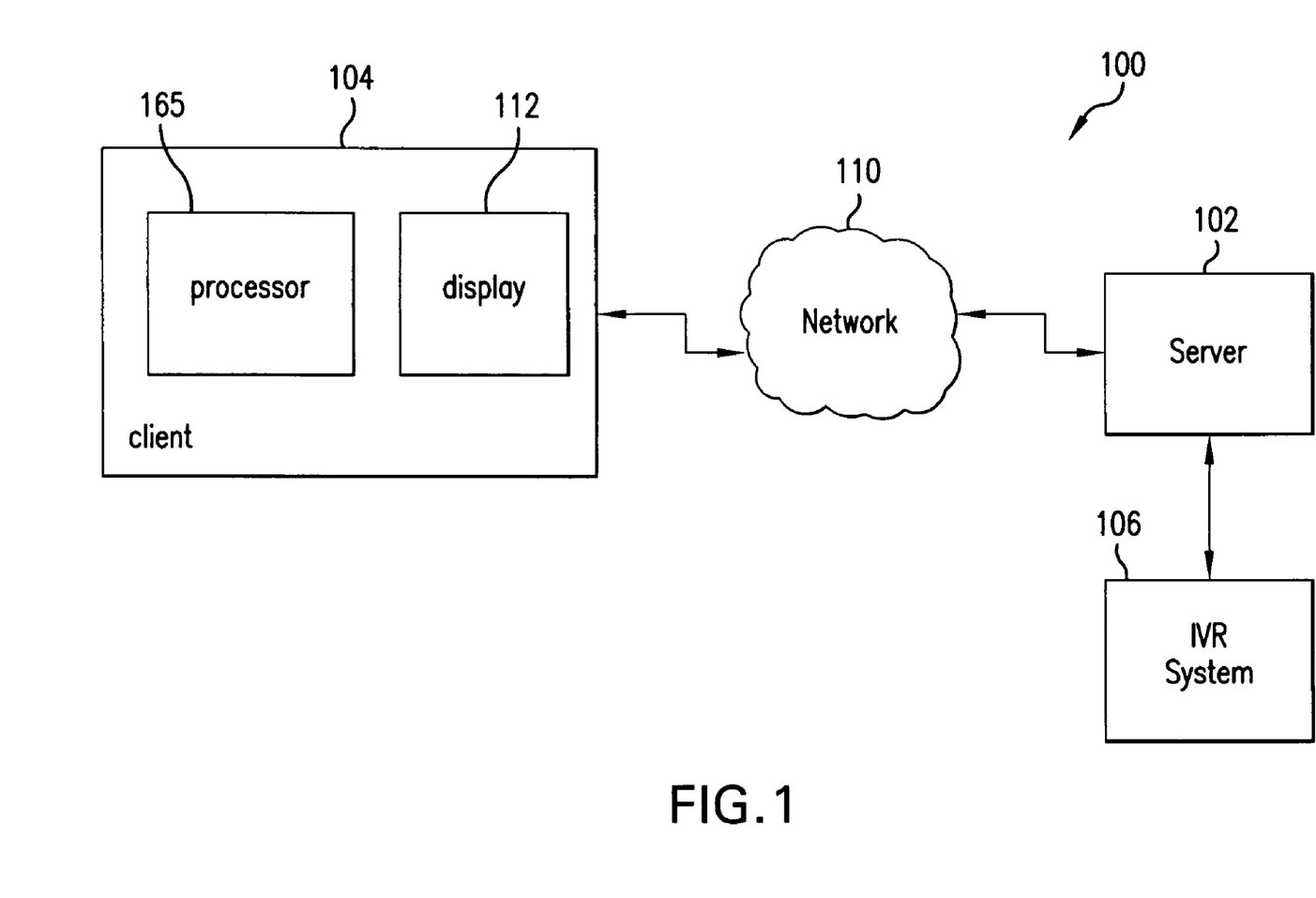
FIG. 1 illustrates a system according to an embodiment of the invention.

In one aspect, the present invention provides a system 100 (see FIG. 1) for enabling a user to more easily navigate an IVR menu. System 100 may include: a server 102, which may comprise one or more computers which may or may not be co-located, and a client communication device 104 that is able to communicate with server 102 using a network 110 (e.g., the Internet or other network). Communication device 104 may include a processor 165 and a display device 112 coupled to the processor for displaying information received from server 102. Communication device 104 may be a personal computer (PC), a mobile telephone, a portable digital assistant, or any other device capable of communicating with server 102 and displaying information received from server 102.

Figure 2:
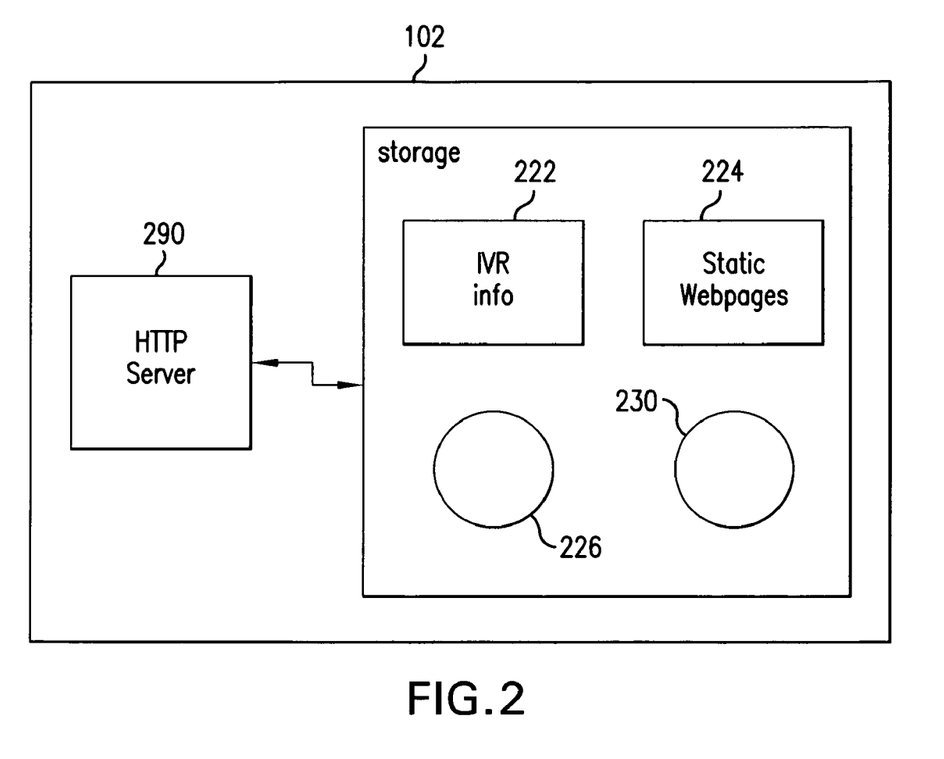
FIG. 2 illustrates a server according to an embodiment of the invention.

Referring now to FIG. 2, FIG. 2 is a functional block diagram illustrating an embodiment of server 102. As illustrated in FIG. 2, server 102 may include a hypertext transfer protocol (HTTP) server 290 for serving webpages (e.g., static webpages or dynamically generated webpages). Server 102 may include or have access to a storage unit 292 for storing IVR menu information 222 as well as static webpages 224 and/or software 226 for dynamically generating webpages. IVR menu information 222 may include information concerning an IVR menu that is associated with a particular telephone number. Server 102 may also include software 230 for communicating with an IVR system 106.

Figure 3:
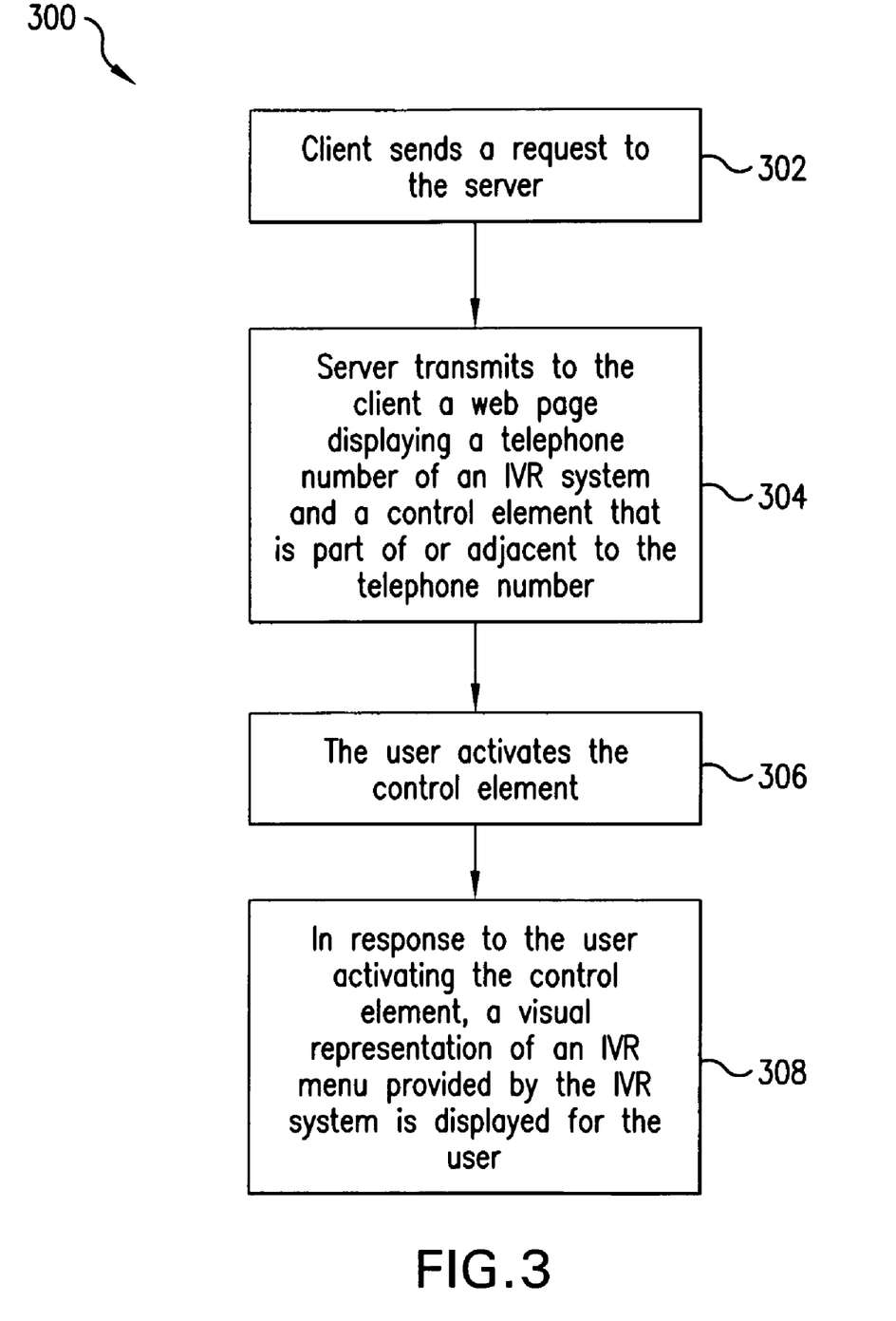
FIG. 3 is a flow chart illustrating a process according to an embodiment of the invention.

Referring now to FIG. 3, FIG. 3 is a flow chart illustrating a process 300 according to an embodiment of the invention. Process 300 may begin in step 302, where a user 101 of communication device 104 (or "client 104") causes communication device 104 to send a request to server 102. In response to receiving the request, server 102 transmits to client 104 a webpage (step 304).

Figure 4:
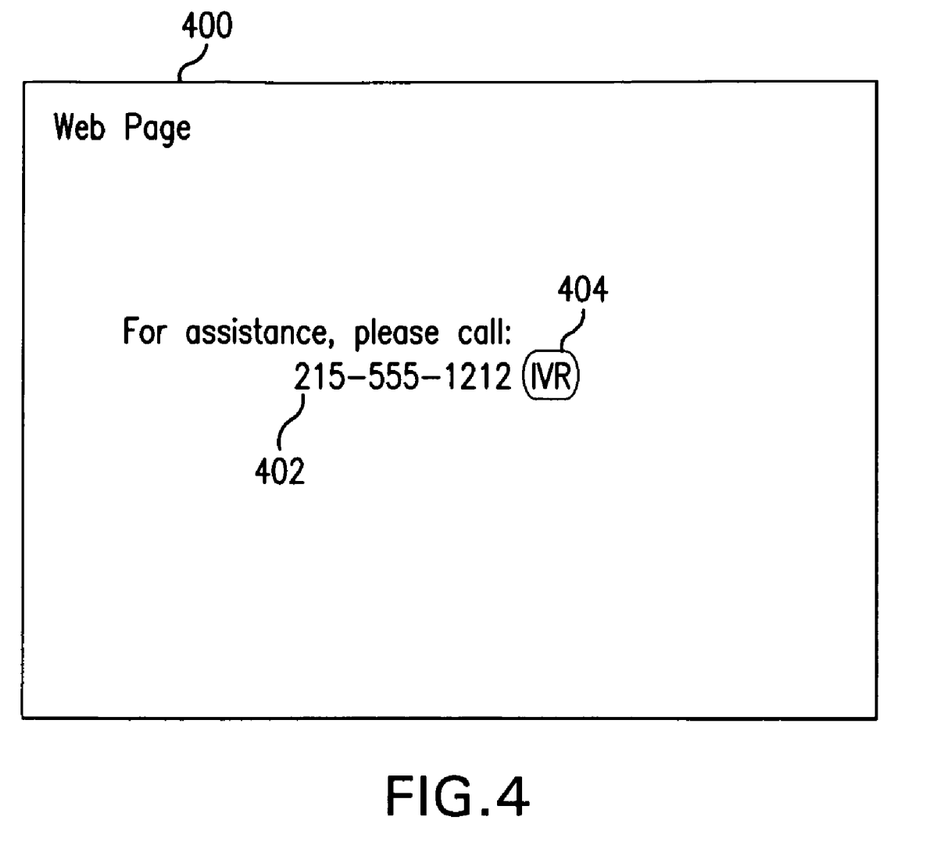
FIG. 4 illustrates an exemplary webpage.

Referring now to FIG. 4, FIG. 4 illustrates an exemplary webpage 400 that may be transmitted to client 104 in step 304. As shown in FIG. 4, webpage 400 may include a telephone number 402 of an IVR system (e.g., IVR system 106) or other content. Advantageously, in some embodiments, webpage 400 also includes an activatable control element 404 (e.g., a hyperlink, button, or other user interface element that may be activated by a user) that may be positioned adjacent to telephone number 402. IVR system 106 includes an IVR menu and when a user dials telephone number 402, the user will get connected to IVR system 106, which will then present orally to the user the IVR menu (e.g., "Press 1 for technical support, Press 2 to speak to an operator, etc.").

Figure 5:
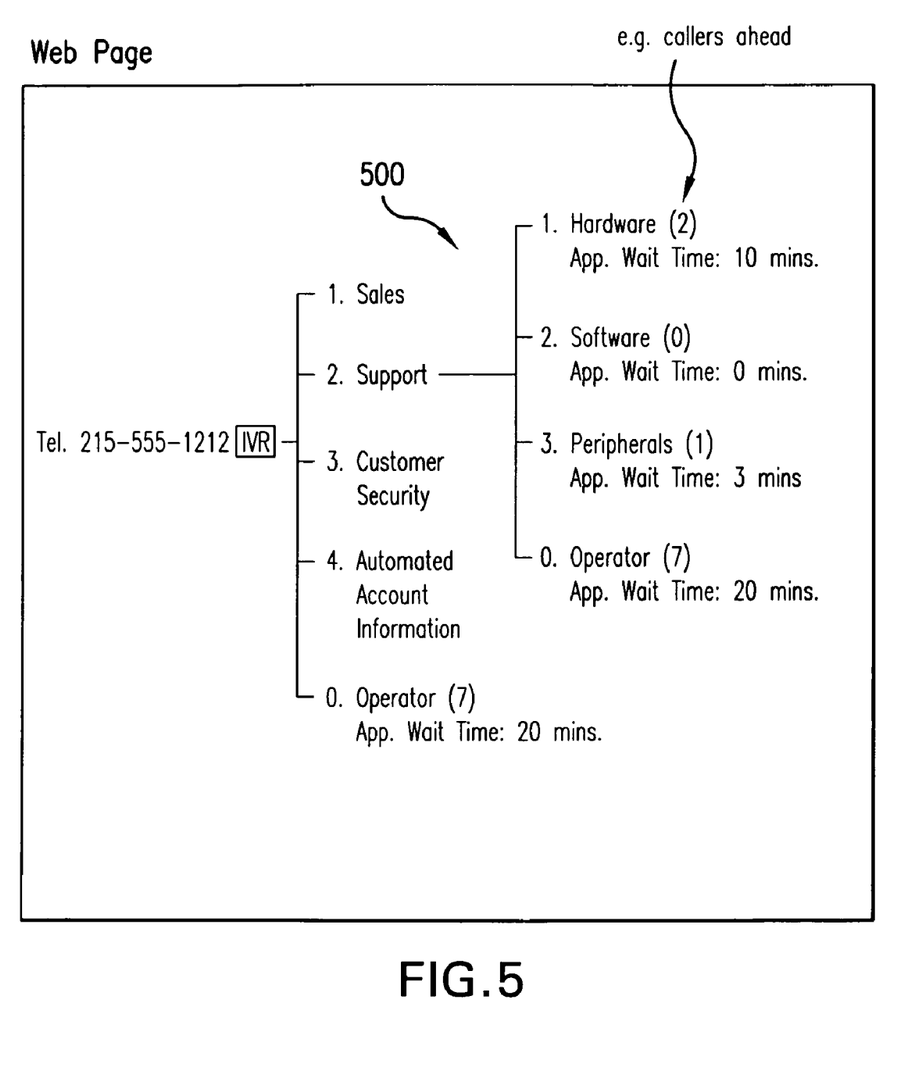
FIG. 5 illustrates an exemplary visual representation of the IVR menu.

Referring back to FIG. 3, in step 306, user 101 activates control element 404 by, for example, clicking on element 404 or hovering a mouse pointer over element 404. In step 308, in response to the user activating control element 404, a visual representation of at least part of the IVR menu is displayed to the user. This feature is illustrated in FIG. 5, which shows an exemplary visual representation 500 of the IVR menu. In some embodiments, telephone number 402 may be activatable (e.g., a hyperlink) such that when user 101 click on telephone number 402 (or merely hovers over telephone number 402) step 308 is performed. That is, control element 404 may be part of telephone number 402.

As illustrated in FIG. 5, the entire tree structure of the IVR menu can be displayed along with the key stroke input associated with each option and a long or short description of the option. In some embodiments, rather than showing the entire tree structure, only the first level of menu options is shown in step 308 and the user can click on a menu option to see that option's sub-menu options.

Additionally, as illustrated in FIG. 5, in some embodiments, visual representation 500 includes, for each final menu option, information indicating to user 101 how long they may have to wait to speak with an operator and/or how many other users are ahead of them in a queue. For example, visual representation 500 indicates that user 101 will have to wait about 10 minutes to speak with a technical support operator for hardware.

This information is very useful to user 101 because, if, for example, user 101 is pressed for time, user 101 may first examine visual representation and then decide to call IVR system 106 now or at a later time when the wait time is less depending on the information provided in the visual representation. In other words, unlike other systems that may display a visual representation of an IVR menu, the present invention does not require that user 101 must first dial the telephone number of IVR system 106 in order to see the visual representation of the system 106's IVR menu.

In some embodiments, when user 101 activates control element 404, client 104 transmits a request to server 102. In response to receiving the request, server 102 (or other computer in communication with server 102) may dynamically generate a webpage containing visual representation 500. After generating the webpage, server 102 transmits the webpage to client 104, which then displays the webpage to user 101.

For example, in some embodiments, server 102 may dynamically generate a webpage containing a tag that points to an object (e.g., an <IMG> tag, or <object> tag) that contains or generates visual representation 500 such that when client 104 receives the webpage client 104 transmits a request for the identified object and displays the object.

In other embodiments, server 102 may dynamically generate a webpage containing a tag that points to computer program stored on a server (e.g., server 102 or a service provider's server) such that when the webpage is received and processed by client 104, client 104 transmits a request to the server, which causes the server to execute the computer program and the computer program is configured to dynamically generate the visual representation 500. After the visual representation 500 is generated, it is transmitted to client 104, which will then display the visual representation 500 within the webpage. In some embodiments, the computer program has access to IVR menu information 222, which may be stored in a file (e.g., an XML file) that is co-located or remote from the computer program, that contains all the information necessary to generate the visual representation 500 of the IVR menu.

In some embodiments, prior to generating the webpage or the visual representation 500, server 102 (or the computer program mentioned above) may query IVR system 106 for wait time and/or queue length information for the IVR menu options so that this information can be included in the visual representation 500.

In other embodiments, when user 101 activates control element 404, client 104 transmits a request to server 102, and, in response, server 102 queries IVR system 106 for wait time and/or queue length information and then, after receiving the requested data from IVR system 106, transmits the data to client 104. In this embodiment, code on client 104 (e.g., javascript code or other code) may generate visual representation 500 and then display the data received from the server together with the visual representation of the menu, as shown in FIG. 5.

In yet other embodiments, when user 101 activates control element 404, code on client 104 (e.g., javascript code, which may be included in webpage 400) retrieves wait time and/or queue length information that was cached in client 104 and then displays visual representation 500 with the wait time and/or queue length information, as shown in FIG. 5.

Figure 6:
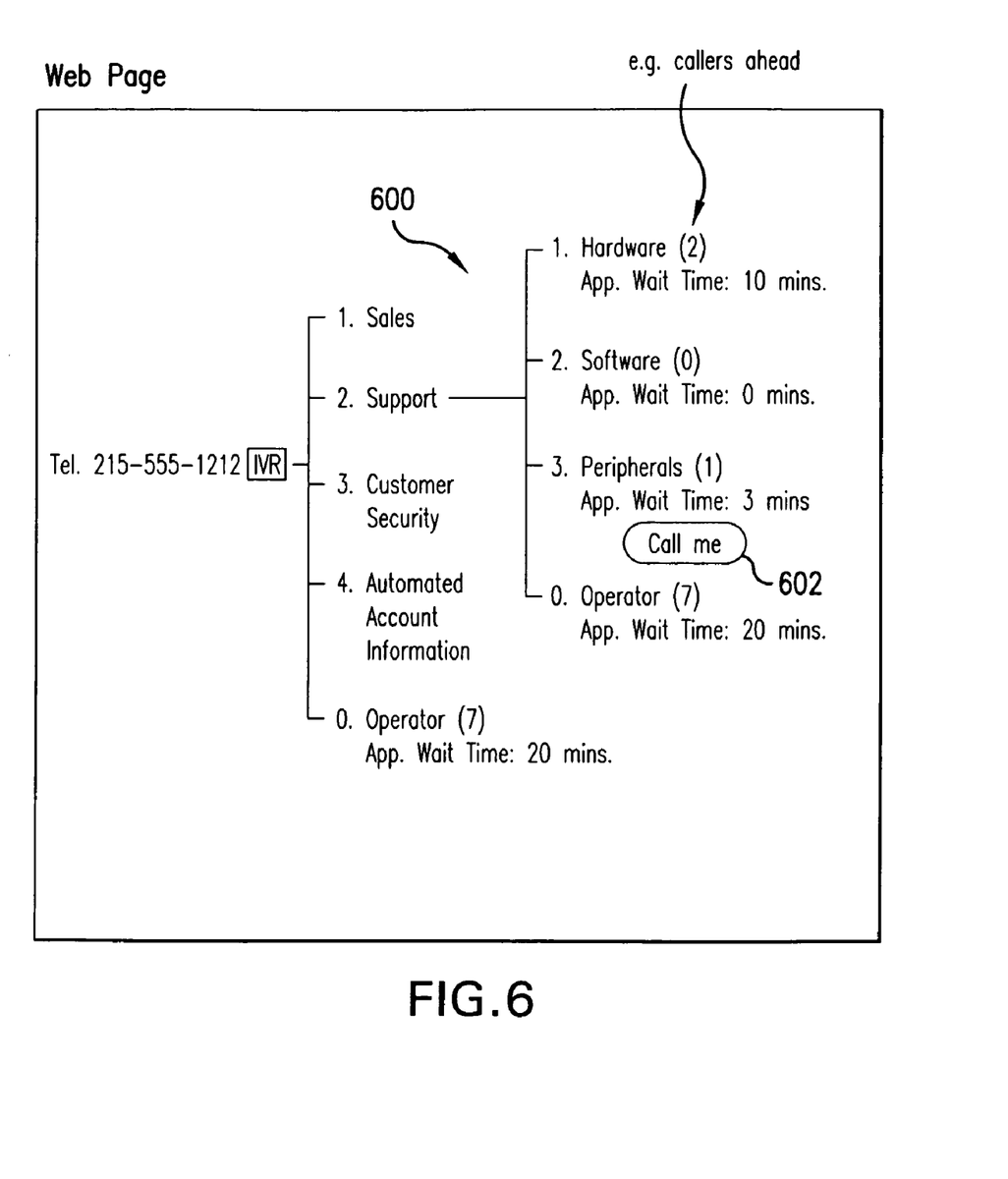
FIG. 6 illustrates an alternative visual representation of the IVR menu.

Referring now to FIG. 6, FIG. 6 illustrates an alternative visual representation 600 of the IVR menu that may be displayed by client 104 to user 101. Visual representation 600 may be very similar to representation 500, but includes one or more "call me" options 602 (e.g., a button or hyperlink having a "call me" label or other like label), with each "call me" option being associated with one of the menu options. When client 104 displays visual representation 600 to user 101, user 101 may activate one of the "call me" options. In response to user 101 activating a call me option, user 101 may be prompted to input a telephone number. After inputting the telephone number, client 104 may transmit the telephone number to IVR system 106 (e.g., via server 102) along with information indicating the menu option associated with the selected "call me" option.

This will enable a person to call user 101 and know before placing the call the type of question, information, or assistance user 101 is seeking. That is, for example, if user 101 activates "call me" option 602, which is associated with the technical support for peripherals menu option, then a technical support person for peripherals will call user 101 at the number user 101 provided when user 101 was prompted to enter a telephone number.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method for facilitating use of an interactive voice response (IVR) system, comprising:
   transmitting a request for a webpage to a server;
   receiving the webpage, wherein the webpage includes a telephone number of the IVR system;
   displaying the webpage, wherein the step of displaying the webpage comprises displaying the telephone number and displaying adjacent to the telephone number a first control element associated with the telephone number, wherein
   the first control element is configured such that in response to a user activating the first control element, a first visual representation of a first level of options of an IVR menu and a second control element are displayed to the user,
   the second control element is configured such that, in response to a user activating the second control element, a second visual representation of a second level of options of the IVR menu is displayed to the user, and
   the first or second visual representation shows wait time or queue length information for at least one menu option of the IVR menu.

2. The method of claim 1, wherein the second visual representation shows the entire tree structure of the IVR menu.

3. The method of claim 1, wherein the first or second visual representation includes a call me option.

4. The method of claim 3, further comprising:
   prompting the user to enter a telephone number at which the user may be reached in response to the user activating the call me option; and
   receiving the entered telephone number.

5. The method of claim 4, wherein the call me option is associated with one of the menu options of the IVR menu.

6. The method of claim 5, further comprising transmitting to a server the entered telephone number together with information identifying the menu option with which the call me option is associated.

7. A method for facilitating use of an interactive voice response (IVR) menu of an IVR system, comprising:
   receiving at a server a request transmitted from a client;
   in response to the request, transmitting from the server to the client webpage data, wherein the webpage data is configured to cause the client to display a telephone number associated with the IVR menu and a first control element such that the first control element is displayed adjacent to the telephone number, wherein
   the webpage data is further configured such that, in response to a user activating the first control element, (a) a first visual representation of the IVR menu and a second control element are displayed to the user without the user ever having to call the telephone number associated with the IVR menu or otherwise connect the client to the IVR system, and (b) the client does not initiate communication with the IVR system associated with the telephone number,
   the second control element is configured such that, in response to a user activating the second control element, a second visual representation of a second level of options of the IVR menu is displayed to the user, and
   the first or second visual representation shows wait time or Queue length information for at least one menu option of the IVR menu.

8. The method of claim 7, wherein the webpage data is configured such that, in response to the user activating the first control element, the client transmits a second request to the server, and the server is configured such that, in response to the second request, the server transmits to the client second webpage data that includes data that causes the client to display the first visual representation of the IVR menu.

9. The method of claim 7, wherein the webpage data includes a script that is configured to display the first visual representation in response to the user activating the first control element.

10. The method of claim 7, wherein the visual representation includes information indicating a wait time and a queue length for an option of the IVR menu.

11. A method for facilitating use of an interactive voice response (IVR) menu, comprising:
receiving a request from a client;
in response to the request, transmitting to the client webpage data that is configured to cause the client to display a first control element associated with a telephone number associated with the IVR menu, wherein
the webpage data is further configured such that, in response to a user activating the first control element, (a) a first visual representation of the IVR menu and a second control element are displayed to the user without the user ever having to call the telephone number associated with the IVR menu or otherwise connect the client to the IVR system and (b) the client does not initiate communication with the IVR system associated with the telephone number,
the second control element is configured such that, in response to a user activating the second control element, a second visual representation of a second level of options of the IVR menu is displayed to the user, and
the first or second visual representation shows wait time or queue length information for at least one menu option of the IVR menu.

12. A system for facilitating use of an interactive voice response (IVR) menu, comprising:
a server program for receiving a request from a client; and
a transmitter for transmitting to the client, in response to the server program receiving the request, webpage data that is configured to cause the client to display a first control element associated with a telephone number associated with the IVR menu, wherein
the webpage data is further configured such that, in response to a user activating the first control element, (a) a first visual representation of the IVR menu and a second control element are displayed to the user without the user ever having to call the telephone number associated with the IVR menu or otherwise connect the client to the IVR system and (b) the client does not initiate communication with the IVR system associated with the telephone number,
the second control element is configured such that, in response to a user activating the second control element, a second visual representation of a second level of options of the IVR menu is displayed to the user, and
the first or second visual representation shows wait time or queue length information for at least one menu option of the IVR menu.

13. The system of claim 12, wherein the server program is a hypertext transfer protocol (HTTP) server.

14. The system of claim 12, wherein the first or second visual representation includes information indicating a wait time and a queue length for an option of the IVR menu.

15. A method for facilitating use of an interactive voice response (IVR) system, comprising:
transmitting, from a client to a server, a request for webpage data;
receiving, at the client, the requested webpage data, wherein the webpage data is configured to cause the client to display a telephone number associated with the IVR system and a first control element such that the first control element is displayed adjacent to the telephone number; and
in response to activation of the first control element, displaying a first visual representation of at least a first level of options of an IVR menu together with (i) wait time or queue length information for one or more of the displayed menu options and (ii) a second control element, wherein
the second control element is configured such that, in response to a user activating the second control element, a second visual representation of a second level of options of the IVR menu is displayed to the user.

16. The method of claim 15, wherein the second visual representation shows the entire tree structure of the IVR menu.

17. The method of claim 15, wherein the first control element is the telephone number.

18. The method of claim 15, wherein the first or second visual representation includes a call me option.

19. A method for facilitating use of an interactive voice response (IVR) menu, comprising:
receiving at a server a request transmitted from a client; and
in response to the request, transmitting from the server to the client webpage data, wherein
the webpage data is configured to cause the client to display a telephone number associated with the IVR menu and a first control element such that the first control element is displayed adjacent to the telephone number,
the webpage data is further configured such that, in response to a user activating the first control element, a first visual representation of the IVR menu and a second control element are displayed to the user without the user ever having to call the telephone number associated with the IVR menu or otherwise connect the client to the IVR system,
the first visual representation of the IVR menu shows at least a first level menu options of the IVR menu and wait time or queue length information for at least one menu option of the IVR menu, and
the second control element is configured such that, in response to a user activating the second control element, a second visual representation of a second level of options of the IVR menu is displayed to the user.

20. The method of claim 19, wherein the first or second visual representation is an image and the webpage includes an IMG tag that points to an image file containing the image.

21. The method of claim 19, wherein the webpage includes a tag associated with a computer program for dynamically generating the first visual representation.

22. The method of claim 20, wherein
the tag causes the client to send a request to the server, and
the server is configured to execute the computer program in response to receiving the request.

23. The method of claim 20, wherein
the tag causes the client to send a request to a service provider's server, and
the service provider's server is configured to execute the computer program in response to receiving the request.

24. A method for facilitating use of an interactive voice response (IVR) system, comprising:
- transmitting a request for a webpage to a server;
- receiving the webpage, wherein the webpage includes a telephone number of the IVR system;
- displaying the webpage, wherein the webpage includes a first control element associated with the telephone number; and
- in response to activation of the first control element, displaying a first visual representation of at least a first level of options of an IVR menu of the IVR system and a second control element, wherein
- the first visual representation includes a call me option,
- the method further comprises prompting the user to enter a call me telephone number in response to the user activating the call me option; and receiving the entered call me telephone number,
- the call me option is associated with one of the menu options of the IVR menu,
- the method further comprises transmitting to a server the entered call me telephone number together with information identifying the menu option with which the call me option is associated,
- the second control element is configured such that, in response to a user activating the second control element, a second visual representation of a second level of options of the IVR menu is displayed to the user, and
- the first or second visual representation shows wait time or queue length information for at least one menu option of the IVR menu.

25. A method for facilitating use of an interactive voice response (IVR) menu, comprising:
- receiving at a server a request from a client;
- in response to the request, transmitting from the server to the client a webpage containing a telephone number associated with the IVR menu and a first control element positioned near the telephone number, wherein
- the webpage is configured such that, in response to a user activating the first control element, a first visual representation of the IVR menu and a second control element are displayed to the user without the user ever having to call the telephone number associated with the IVR menu, wherein
- the webpage includes a script that is configured to display the first visual representation in response to the user activating the control element,
- the second control element is configured such that, in response to a user activating the second control element, a second visual representation of a second level of options of the IVR menu is displayed to the user, and
- the first or second visual representation shows wait time or queue length information for at least one menu option of the IVR menu.

* * * * *